United States Patent
Kelly

(10) Patent No.: US 10,048,446 B2
(45) Date of Patent: Aug. 14, 2018

(54) HYBRID COPPER/FIBER CONNECTOR, SYSTEMS AND METHODS

(71) Applicant: CommScope Technologies LLC, Hickory, NC (US)

(72) Inventor: Sean Patrick Kelly, York, PA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 15/520,520

(22) PCT Filed: Oct. 20, 2015

(86) PCT No.: PCT/IB2015/002174
§ 371 (c)(1),
(2) Date: Apr. 20, 2017

(87) PCT Pub. No.: WO2016/063135
PCT Pub. Date: Apr. 28, 2016

(65) Prior Publication Data
US 2017/0315301 A1    Nov. 2, 2017

Related U.S. Application Data

(60) Provisional application No. 62/066,192, filed on Oct. 20, 2014.

(51) Int. Cl.
*G02B 6/38* (2006.01)
(52) U.S. Cl.
CPC .............. *G02B 6/38* (2013.01); *G02B 6/3817* (2013.01)

(58) Field of Classification Search
None
See application file for complete search history.

(56) References Cited

U.S. PATENT DOCUMENTS

| | | | |
|---|---|---|---|
| 5,234,353 A | 8/1993 | Scholz et al. | |
| 5,268,983 A | 12/1993 | Tatarka et al. | |
| 5,317,663 A | 5/1994 | Beard et al. | |
| 5,419,717 A * | 5/1995 | Abendschein | G02B 6/3817 385/139 |
| 5,473,715 A * | 12/1995 | Schofield | G02B 6/3817 385/53 |

(Continued)

FOREIGN PATENT DOCUMENTS

| | | |
|---|---|---|
| EP | 1 199 587 A A1 | 4/2002 |
| GB | 2 289 140 A1 | 11/1995 |

(Continued)

OTHER PUBLICATIONS

International Search Report and Written Opinion of the International Searching Authority for corresponding International Patent Application No. PCT/IB2015/002174 dated Jul. 7, 2016, 9 pgs.

(Continued)

*Primary Examiner* — Sung Pak
(74) *Attorney, Agent, or Firm* — Merchant & Gould P.C.

(57) ABSTRACT

A connector, a system, and a method provide a single interface at a device for power and optical inputs or outputs. A single interface at the DC source allows for a single connection to the power and optical signals from the splitter. The connector can be used at other locations needing both power and optical signal connectivity.

10 Claims, 2 Drawing Sheets

(56) References Cited

U.S. PATENT DOCUMENTS

| | | | |
|---|---|---|---|
| 5,666,453 A * | 9/1997 | Dannenmann | G02B 6/3895 385/100 |
| 5,970,196 A | 10/1999 | Greveling et al. | |
| 6,543,941 B1 | 4/2003 | Lampert | |
| 6,588,938 B1 | 7/2003 | Lampert et al. | |
| 6,597,844 B1 | 7/2003 | Witt et al. | |
| 6,813,421 B2 | 11/2004 | Lail et al. | |
| 6,876,798 B2 | 4/2005 | Triplett et al. | |
| 8,509,422 B2 | 8/2013 | Wang et al. | |
| 8,601,289 B1 * | 12/2013 | Smith | H04L 12/10 713/300 |
| 9,459,411 B2 | 10/2016 | Smith et al. | |
| 2009/0214221 A1 * | 8/2009 | Li | H04B 10/40 398/136 |
| 2010/0296779 A1 | 11/2010 | Lu et al. | |
| 2011/0243567 A1 | 10/2011 | Su et al. | |
| 2011/0262077 A1 | 10/2011 | Anderson et al. | |
| 2011/0311187 A1 | 12/2011 | Wang et al. | |
| 2012/0039571 A1 * | 2/2012 | Ciechomski | G02B 6/4475 385/78 |
| 2012/0302104 A1 | 11/2012 | Wu | |
| 2013/0202254 A1 | 8/2013 | Gurreri et al. | |
| 2017/0184798 A1 * | 6/2017 | Coenegracht | G02B 6/3817 |

FOREIGN PATENT DOCUMENTS

| | | |
|---|---|---|
| WO | 2013/189370 A2 | 12/2013 |
| WO | 2014/126975 A1 | 8/2014 |
| WO | 2014/197103 A3 | 12/2014 |

OTHER PUBLICATIONS

"Cloudsplitter—Ethernet and Power Technology", TE Connectivity, 4 pages (2014).

"New product Development and Product advancement—At the speed of light, from Concept, Design, Tooling, Testing and Mass Production", SENKO Advanced Components, 40 pages (2014).

"CloudSplitter Hybrid Fiber Power Concept", TE Connectivity, 4 pages (2014).

* cited by examiner

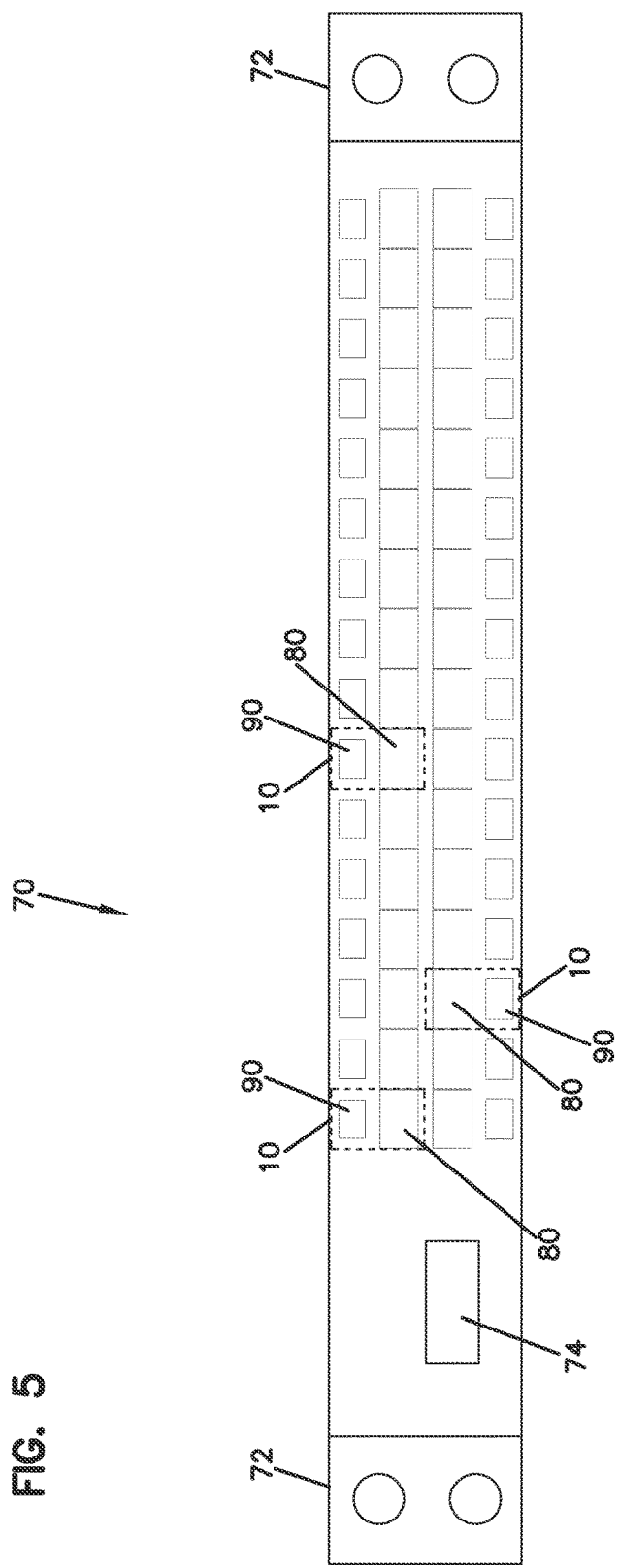

HYBRID COPPER/FIBER CONNECTOR, SYSTEMS AND METHODS

CROSS-REFERENCE TO RELATED APPLICATION

This application is a National Stage Application of PCT/IB2015/002174, filed on Oct. 20, 2015, which claims the benefit of U.S. Patent Application Ser. No. 62/066,192, filed on Oct. 20, 2014, the disclosures of which are incorporated herein by reference in their entireties. To the extent appropriate, a claim of priority is made to each of the above disclosed applications.

BACKGROUND

Current Passive Optical LANs (POL/PON) use edge devices called ONTs (Optical Network Terminal) to convert the optical signal to a standard RJ45 twisted pair output. These ONTs require a power source to operate. They require power for general operation as well as for providing PoE (Power over Ethernet) power to peripheral devices such as IP Phones, cameras, WAPs, card readers, biometric units, etc. Generally there are two methods for powering these ONTs. The first is the standard AC power using a power brick. This is sometimes not desired or practical if there is not a place to store the brick or an outlet in place. Another problem is the lack of emergency back up on AC power. The second option is called DC remote powering where a DC power source is located somewhere in the building and attached to a building emergency source. A two conductor cable is then sent to each ONT along with a separate optical fiber or a composite cable containing both. In either case, the plug and outlet interface is always separate. Depending on the distance from the DC source, a variety of cable sizes can be used. This requires different connector types, neither of which are actually intended for powering. Field termination makes it even more complex.

SUMMARY

This invention provides a connector, a system and a method for providing a single interface at the ONT for power and optical input. In addition, it also provides a single interface at the DC source allowing for a single connection to the power and optical signal from the splitter. This interface accommodates field installation as well as factory assemblies. The connector can also be used at other locations needing both power and optical signal connectivity.

BRIEF DESCRIPTION OF THE DRAWINGS

FIG. 5 shows a power distribution unit with an integrated fiber splitter including a plurality of the hybrid copper/fiber adapters of FIG. 1.

DETAILED DESCRIPTION

A hybrid connector in accordance with the invention uses the commonly known SC/APC optical fiber connector. The SC/APC is the interface connector at the ONT and also at the splitter. The SC family of connectors use an outer housing that is used to decouple the plug from the adapter. This invention builds upon that known housing and adds features that will accommodate contact pins that attach to the copper cable used for powering. This allows the optical cable to be terminated to the SC body as normal, but the installer can now crimp the contact pins to the copper conductors, either separate or part of a composite cable, and insert them into the hybrid outer housing interface. The receiving receptacle body in the ONT and at the DC power source will accept the optical plug and powering pins at one single location, eliminating the congestion of two different plugs at two different locations.

The ONTs have a built in feature called "last gasp" where inside the ONT there is a small capacitor that stores enough energy so that in the event of a power loss, it can send a last gasp signal through the optical interface back to the head end OLT. With this invention, the decoupling feature of the outer housing will decouple the power during the first action just prior to the optical interface separation. This feature not only allows for last gasp abilities, but can also indicate if there is a general power failure or if the housing is decoupled.

The design of this invention, by nature of maintaining a basic SC connector footprint as the base, allows backwards compatibility in that if alternate powering is preferred, a standard SC/APC connector can still be mated into the optical coupling. Additionally, there is an alternate variation included in this invention that allows a separate power coupling device to attach to an already deployed SC/APC connector mated to the hybrid receptacle as a retrofit option in this invention. The "add-on" and "backwards compatible" features further provide flexibility for different users of optical systems.

FIGS. 1-4 show various arrangements of the hybrid copper/fiber connectors and adapters. The SC connector uses a sliding outer housing to decouple the optical connection from the SC adapter.

FIG. 5 shows a PDU (Power Distribution Unit) with an integrated splitter where the fiber ports (adapters) are combined with power ports (copper) for mating with the hybrid SC fiber and power connectors.

Figure 1:
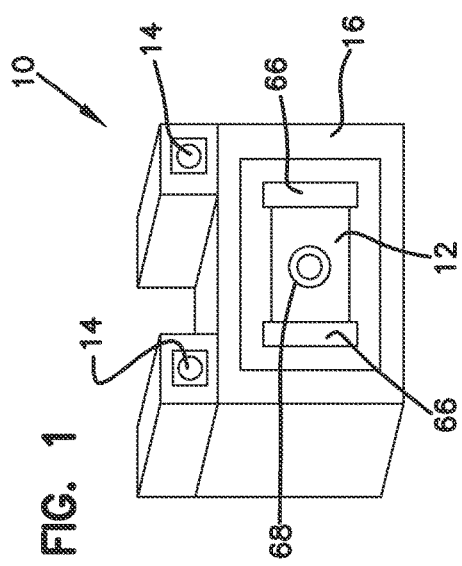
FIG. 1 shows an example of a hybrid copper/fiber adapter.

Referring now to FIG. 1, a one-piece SC port or adapter 10 for hybrid copper/fiber usage includes a fiber connector port 12 and two receptacles 14 for receipt of power pins. As shown, the receptacles 14 are integrally formed and/or connected to the fiber adapter body 16. Alternatively, the receptacles 14 could be designed and integrated into the appliance device (such as a panel) allowing for the use of a standard SC adapter.

Figure 2:
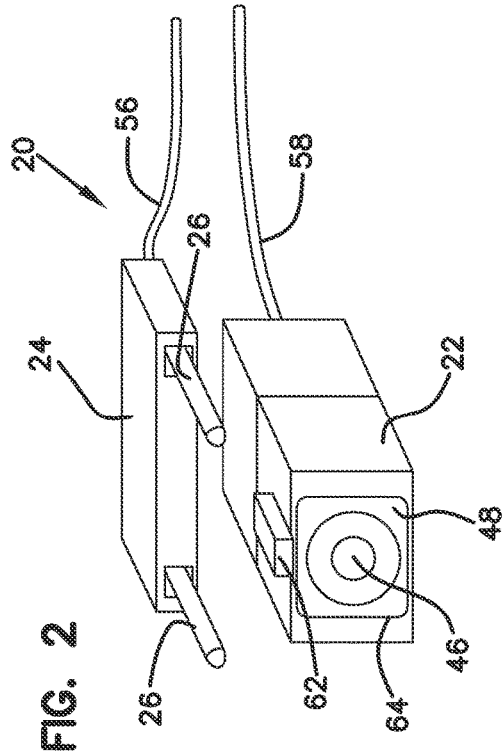
FIG. 2 shows a first embodiment of a hybrid copper/fiber connector.

Referring now to FIG. 2, a first embodiment of a hybrid copper/fiber connector 20 is shown. Connector 20 includes a standard SC outer housing 22 with a separate power pin housing 24. The power pins can be any design mateable with the receptacles 14. One example is a pin and receptacle design by TE Connectivity entitled Micro MATE-N-LOC, or other mating conductive contact designs.

Figure 3:
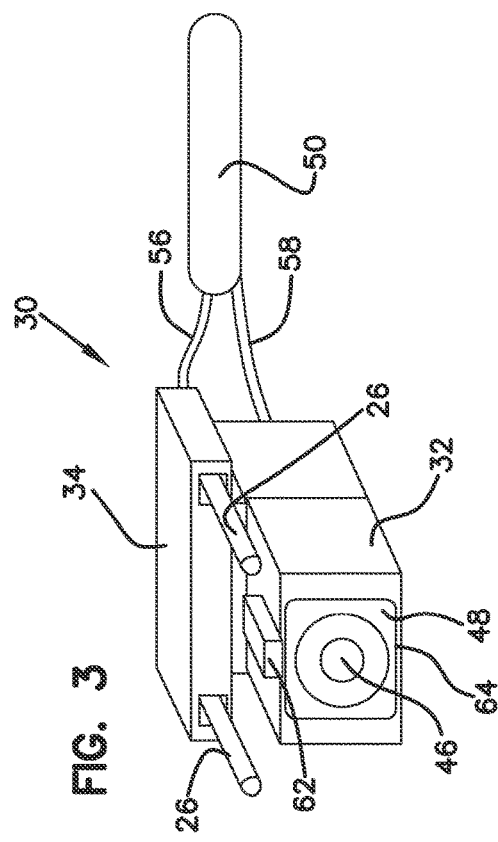
FIG. 3 shows a second embodiment of a hybrid copper/fiber connector.

Referring now FIG. 3, a second embodiment of a hybrid copper/fiber connector 30 is shown. Connector 30 includes a one-piece SC outer housing with an integral power pin housing 34 connected to an outer housing 32 of the SC connector.

Figure 4:
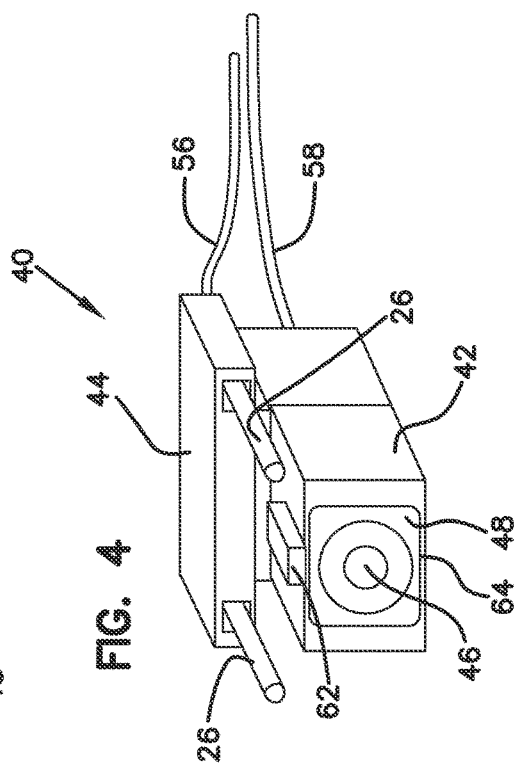
FIG. 4 shows a third embodiment of a hybrid copper/fiber connector.

Referring now to FIG. 4, a third embodiment of a hybrid copper/fiber connector 40 is shown. Connector 40 includes a one-piece SC outer housing with an integral power pin housing 44 connected to the outer housing 42 of the SC connector.

In both of connector 30 and connector 40, various pins can be used including the TE Connectivity Micro MATE-N-LOC connector system for connecting to the adapter 10.

Each connector 20, 30, 40 includes an inner housing 48 which holds a ferrule 46 and the fiber. The inner housing 48 and ferrule 46 are moveably axially relative to the respective outer housings 22, 32, 42.

As shown in FIGS. 2-4, variations in the cable extending from the connectors 20, 30, 40 are possible. A composite cable 50 is shown in FIG. 3 containing both the copper lines 56 and fiber transmission line 58. FIGS. 2 and 4 show separate copper transmission lines 56 from the fiber transmission line 58.

With respect to the hybrid adapter 10 including the connector port 12 and the adapter body 16 of FIG. 1, clips 66 are provided to connect to connectors 20, 30, 40. The connectors 20, 30, 40 include an outer housing which will slide away from a front end 64 to release the connection between the outer housings 22, 32, 42 and the clips 66 of the adapter body 16. A key 62 helps with connector alignment. A further example of the interface between the connectors and the adapter for fiber connectivity is shown and described in U.S. Pat. No. 5,317,663, the disclosure of which is incorporated by reference. This noted patent shows and describes a typical design and operation of an SC connectivity interface. An opposite end of connector port 12 typically will receive another SC connector thereby creating the fiber transmission pathway from connector to connector by fiber alignment through a ferrule alignment sleeve 68.

Referring now to FIG. 5, a power distribution unit 70 is shown. Unit 70 includes an integrated fiber splitter. Unit 70 is in the form of a rack mounted panel including mounting flanges 72. A portion of unit 70 includes a power input 74. One example is a 10-2 AWG cable and connector from a MDA (main distribution area). A digital rectifier at the MDA converts AC power to DC power for distribution through unit 70.

In unit 70, a fiber splitter or splitters will split an input fiber signal and send a split signal to each adapter 10. As shown, unit 70 includes two rows of adapters 10. Adapters 10 are inversely mounted in the two rows. Each adapters 10 includes a fiber signal connection location 80 (see 12) and an electrical power connection location 90 (see 14). The ports 10 each allow for receipt of one of connectors 20, 30, 40 to connect a hybrid copper and fiber cable or cables to a remote device, such as an ONT. The fiber signal is carried by a fiber cable, and the electrical power is carried by copper cables, such as 18-2 AWG cables. At the remote device, the cable is terminated by a similar connector 20, 30, 40.

As noted, each of adapters 10 can receive a hybrid copper/fiber connector 20, 30, 40, or a standard fiber connector without a power connectivity feature.

The MDA (the Main Distribution Area) could also be a Data Center, Main Equipment Room (MER), Main Telecom Room (MTR), Main Distribution Frame (MDF), Telecom Room (TR), Intermediate Telecom Room (ITR), Intermediate Distribution Frame (IDF), or other. In one embodiment the power is input to unit 70 as DC power originating from a DC rectifier located in that MDA or other that has converted AC power to DC power. A local AC powered version where the DC rectifier would be on board is also possible. The cable size is also not limited to listed example 10-2, though it tends to be more common. The fiber is input to unit 70 in the back or through a front port, depending on spacing on the panel itself, user needs or other concerns.

What is claimed is:

1. A hybrid telecommunications connector comprising:
   a fiber optic connector portion defining an SC connector including a ferrule for holding a fiber, an inner housing and a slideable outer housing; and
   an electrical connector portion including an electrical connector housing and at least two electrical contacts, the electrical connector housing mounted to the outer housing of the fiber optic connector portion,
   wherein the hybrid telecommunications connector is coupled to an optical network terminal including optical to electrical conversion circuitry powered by the electrical connector portion of the hybrid telecommunications connector, and
   wherein the optical network terminal includes last gasp circuitry and wherein the hybrid telecommunications connector is configured such that when the hybrid telecommunications connector is uncoupled from the optical network terminal, the electrical connector portion disconnects from the optical network terminal before the fiber optic connector portion disconnects from the optical network terminal.

2. The connector of claim 1, wherein the outer housing of the fiber optic connector portion is mounted to the electrical connector housing of the electrical connector portion.

3. The connector of claim 1, wherein the electrical contacts include pins.

4. The connector of claim 1, further comprising a hybrid cable.

5. The connector of claim 4, further comprising a second hybrid telecommunications connector at a distal end of the hybrid cable.

6. The connector of claim 1, further comprising a device with a hybrid adapter for receiving and/or transmitting a fiber signal from/to the fiber optic connector portion, and a power connector for connecting to the electrical connector portion.

7. The connector of claim 6, wherein the device includes a plurality of hybrid adapters.

8. The connector of claim 7, wherein the device includes a power distribution system, and a fiber signal splitter.

9. The connector of claim 1, wherein the electrical connector portion is retro-fit onto the fiber optic connector portion.

10. A hybrid telecommunications connector comprising:
    a fiber optic connector portion defining an SC connector including a ferrule for holding a fiber, an inner housing and a slideable outer housing; and
    an electrical connector portion including an electrical connector housing and at least two electrical contacts, the electrical connector housing mounted to the outer housing of the fiber optic connector portion,
    wherein the hybrid telecommunications connector is coupled to an optical network terminal including optical to electrical conversion circuitry powered by the electrical connector portion of the hybrid telecommunications connector, and
    wherein the optical network terminal includes last gasp circuitry, and wherein the hybrid telecommunications connector is configured such that when the hybrid telecommunication connector is uncoupled from the optical network terminal, the electrical connector portion disconnects from the optical network terminal before an optical connection with the optical network terminal is broken.

* * * * *